United States Patent [19]
Luger et al.

[11] Patent Number: 5,205,580
[45] Date of Patent: Apr. 27, 1993

[54] WHEEL SUSPENSION SYSTEM

[75] Inventors: Martin Luger, Leonberg; Reinhard Lechner, Rapperswil, both of Fed. Rep. of Germany

[73] Assignee: Dr. Ing. h.c.F. Porsche AG, Weissach, Fed. Rep. of Germany

[21] Appl. No.: 717,822

[22] Filed: Jun. 21, 1991

[30] Foreign Application Priority Data

Jun. 21, 1990 [DE] Fed. Rep. of Germany ....... 4019761

[51] Int. Cl.$^5$ .............................................. B60G 3/26
[52] U.S. Cl. .................................................. 280/675
[58] Field of Search ............... 280/673, 675, 688, 690, 280/691

[56] References Cited

U.S. PATENT DOCUMENTS

| | | | |
|---|---|---|---|
| 4,457,537 | 7/1984 | van der Ohe et al. | 280/675 |
| 4,591,184 | 5/1986 | Matchinsky | 280/675 |

FOREIGN PATENT DOCUMENTS

| | | |
|---|---|---|
| 0202449 | 11/1986 | European Pat. Off. . |
| 967921 | 12/1957 | Fed. Rep. of Germany . |
| 1630370 | 11/1971 | Fed. Rep. of Germany . |
| 2333658 | 7/1977 | France . |
| 0071309 | 4/1985 | Japan .................................. 280/675 |
| 1412014 | 10/1975 | United Kingdom ................ 280/675 |

*Primary Examiner*—Margaret A. Focarino
*Assistant Examiner*—Tamara L. Graysay
*Attorney, Agent, or Firm*—Evenson, Wands, Edwards, Lenahan & McKeown

[57] ABSTRACT

A wheel suspension system for a motor vehicle is described for influencing wheel movement during suspension operations by a positively guided wheel suspension link which can be swivelled on the vehicle body about an axis formed by link bearings and, by way of bearings, is supported on the wheel carrier in an articulated manner. The wheel suspension link is linked to the wheel carrier by bridge elements forming coupling squares which are set at an angle with respect to one another with respect to a perpendicular wheel center longitudinal plane. Longitudinal planes extending through the bridge elements intersect with one another approximately in the perpendicular longitudinal center plane and approximately at the level of the wheel contact surface. Because of the linkage of the wheel suspension link on the wheel carrier by the bridge elements forming coupling squares, during suspension movements of the wheel, essentially only a track change of the wheel can take place. A camber change as well as a bump toe-in or a bump toe-out is largely excluded or is negligible.

10 Claims, 3 Drawing Sheets

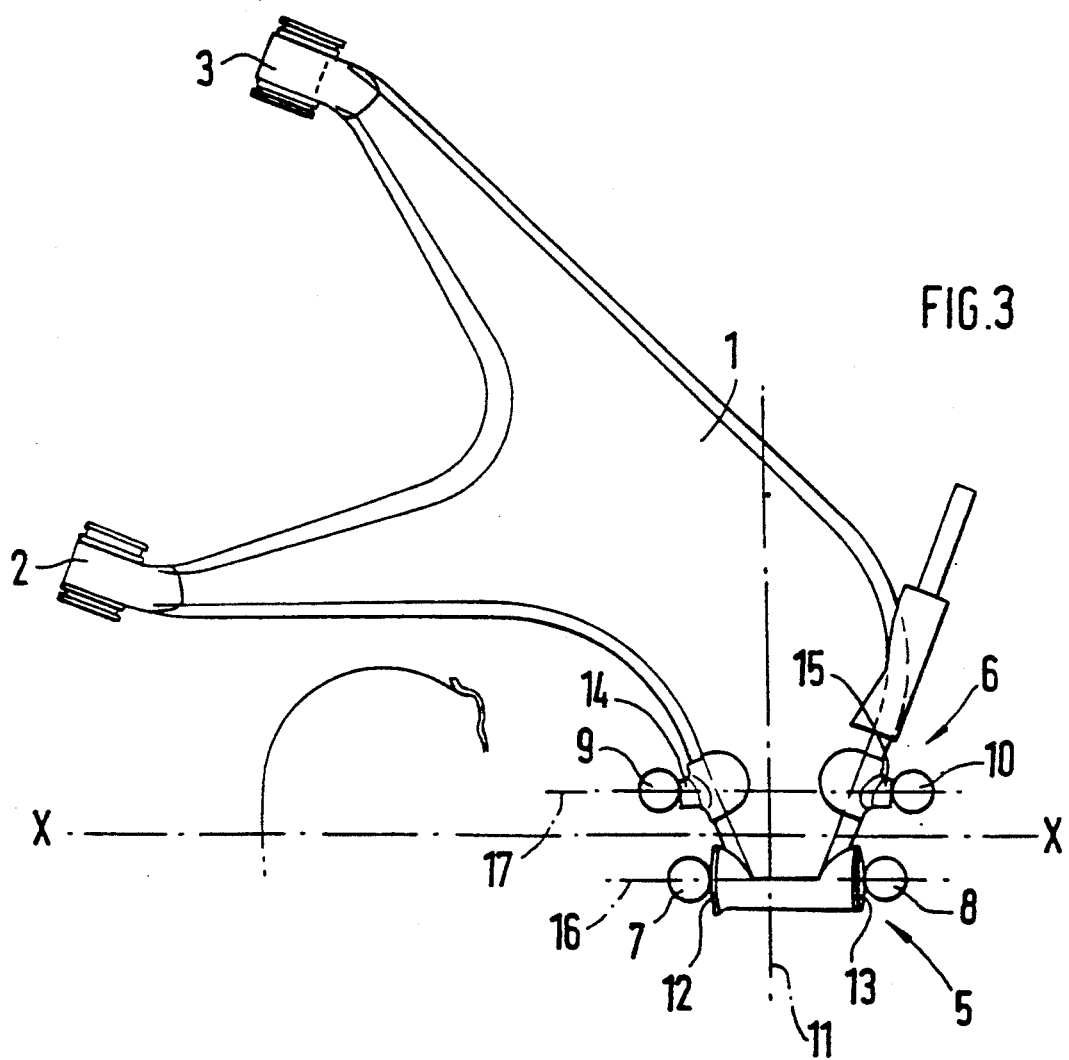

WHEEL SUSPENSION SYSTEM

BACKGROUND AND SUMMARY OF THE INVENTION

The present invention relates to a wheel suspension system for a motor vehicle for influencing a wheel movement during suspension operations by means of a positively guided wheel suspension link which can be swivelled on the vehicle body about an axis formed by link bearings and, by way of bearings, is supported on the wheel carrier in an articulated manner and has a spring strut and/or damper strut held on the wheel carrier.

During suspension movements in wheel suspensions for motor vehicles, a change of the wheel position takes place, such as a camber change or a bump toe-in or a bump toe-out, which is not always desirable because it can disadvantageously influence the vehicle handling.

An object of the present invention is to provide an improved wheel suspension system which, during suspension movements, largely prevents a wheel position change having a disadvantageous effect on the vehicle handling.

This and other objects are achieved by the present invention which provides a wheel suspension system for a motor vehicle for influencing wheel movement during suspension operations, and comprises link bearings coupled to a wheel carrier of the motor vehicle, and a positively guided wheel suspension link which is swivellable on a vehicle body about an axis formed by the link bearings and is supported on the wheel carrier in an articulated manner. Bridge elements form coupling squares, these bridge elements linking the wheel suspension link to the wheel carrier. The bridge elements are set with respect to one another at an angle ($\alpha$) with respect to a perpendicular wheel center longitudinal plane, and such that longitudinal planes which extend through the bridge elements intersect with one another approximately in the perpendicular longitudinal center plane and approximately at a level of a wheel contact surface.

Some principal advantages achieved by the invention are that, by means of the linking of the wheel suspension link to the wheel carrier by way of bridge elements forming coupling squares, during suspension movements of the wheel, essentially only a track change of the wheel can take place. A camber change as well as a bump toe-in or a bump toe-out are largely excluded or negligible.

For this purpose, the bridge elements are set at an angle with respect to the perpendicular wheel center longitudinal plane so that, approximately at the level of the wheel contact area and approximately in the perpendicular longitudinal center plane of the wheel, a cutting edge is formed between the imaginary longitudinal planes receiving the bridge elements.

The invention can be used for all types of wheel suspension systems, such as trailing arm axles, control arm axles, and semi-trailing arm axles. A setting of the bridge elements can take place corresponding to the requirements of the wheel adjustment so that the cutting edge may also be situated above or below the wheel contact plane.

Also, as a result of the interconnected bridge elements, during suspension operations, the wheel will always be disposed perpendicular with respect to the road.

Other objects, advantages and novel features of the present invention will become apparent from the following detailed description of the invention when considered in conjunction with the accompanying drawings.

BRIEF DESCRIPTION OF THE DRAWINGS

FIG. 3 is a top view of the wheel suspension system of FIGS. 1 and 2.

DETAILED DESCRIPTION OF THE DRAWINGS

The wheel suspension system of the present invention comprises a suspension link 1 which, by way of pivot bearings 2 and 3, is disposed on the vehicle body and is pivotally supported on the wheel carrier 4 by bridge elements 5 and 6 which, in each case, form coupling squares.

Figure 1:
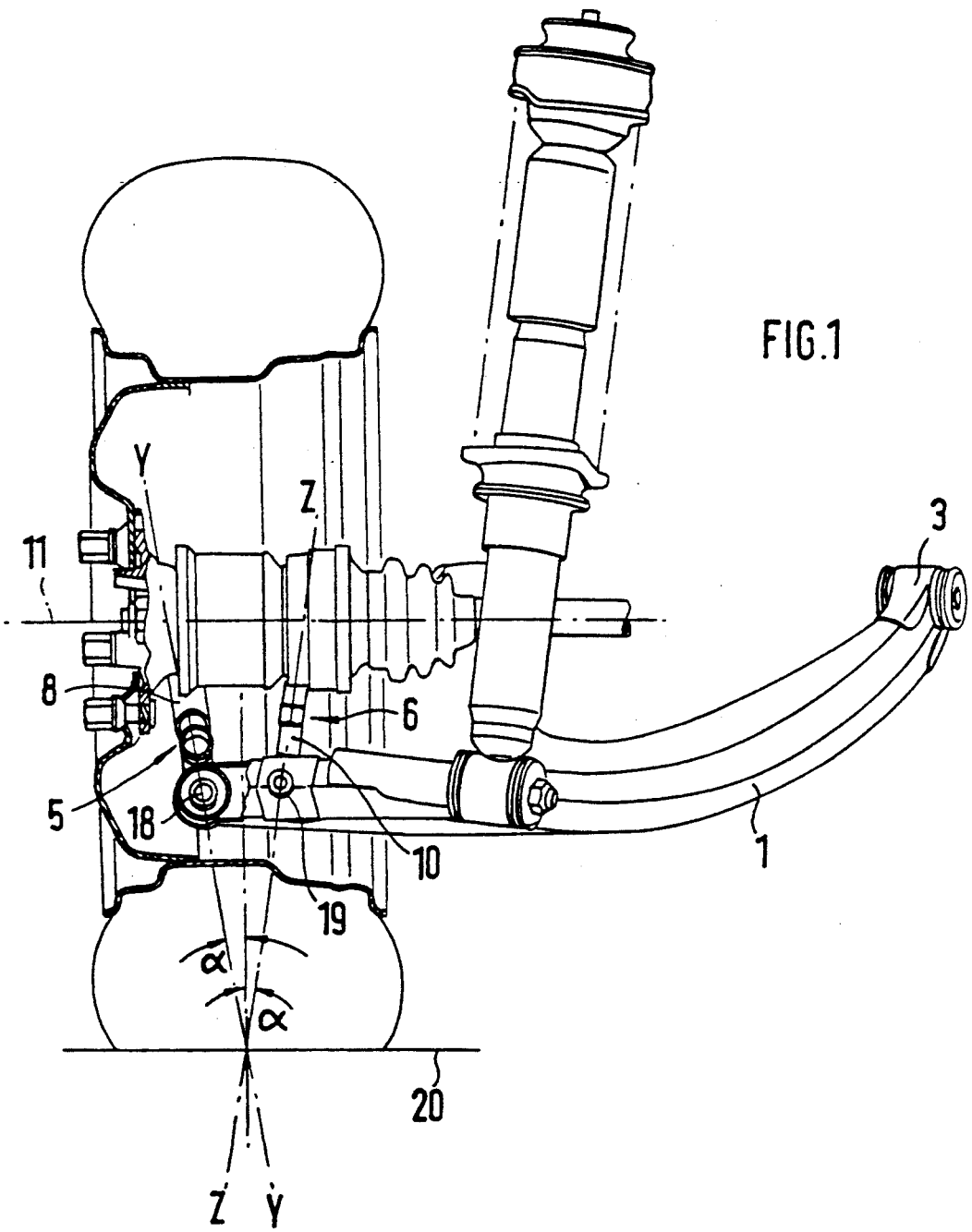
FIG. 1 is a front view of a wheel suspension system with interconnected bridge elements constructed in accordance with an embodiment of the present invention.
Figure 2:
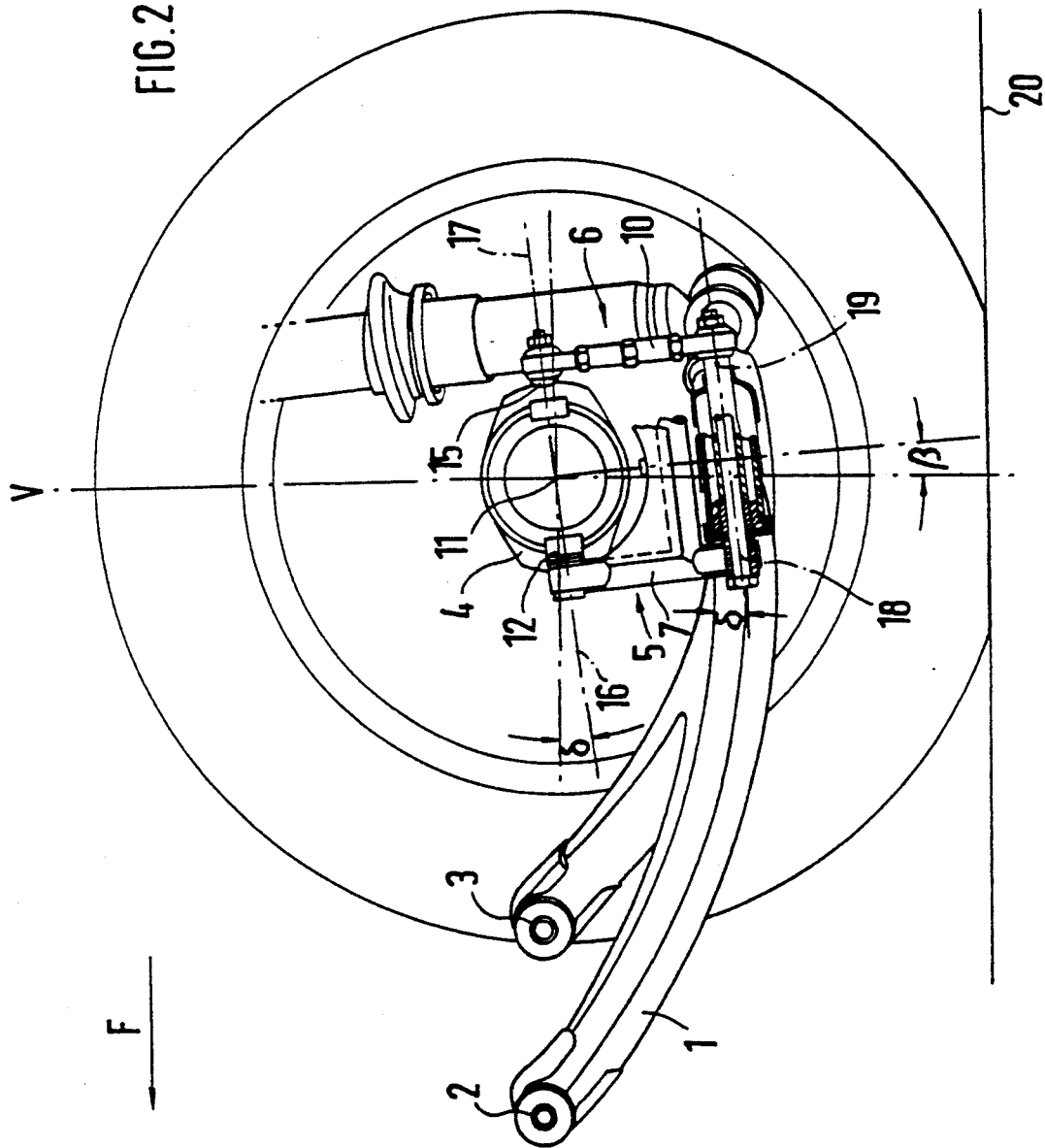
FIG. 2 is a lateral view of the wheel suspension system of FIG. 1, with only one half of each bridge element being shown.

Bridge element 5 has intermediate links 7, 8 which are arranged on both sides of a spin axis 11, as shown in detail in FIG. 2. Similarly, bridge element 6 also has intermediate links 9, 10 arranged on both sides of spin axis 11. The intermediate links, 7, 8, 9, 10 are disposed on the wheel carrier 4 in link bearings 12, 13, and 14, 15 which each form a swivel axis 16 and 17. The free ends of the intermediate links 7, 8 facing away from these link bearings 12, 13 are pivotally held on a shaft 18, which is connected with the wheel carrier 4. Likewise, the free ends of the intermediate links 9, 10 facing away from the link bearings 14, 15 are pivotally held on a shaft 19 which is connected with the wheel carrier 4.

The bridge elements 5, 6 are arranged on both sides of the perpendicular wheel center longitudinal plane X—X and are set at an angle $\alpha$ with respect to this plane X—X in such a manner that the imaginary planes Y—Y and Z—Z extending through the bridge elements 5, 6 intersect with one another at the level of the wheel contact surface 20 and in the wheel center longitudinal plane X—X.

As shown in detail in FIG. 2, the intermediate links 7, 8 and 9, 10 of the bridge elements 5, 6 are arranged in parallel with respect to one another and in the longitudinal planes Y—Y and Z—Z, and the axes 16, 17 extend at a right angle with respect to them. The axes of the shafts 18, 19 as well as the swivel axes 16, 17 are arranged in parallel with respect to the perpendicular longitudinal center plane X—X of the wheel, the axes 16 and 18 of the bridge element 5, with respect to the longitudinal axis of the vehicle, being arranged outside the wheel center longitudinal plane X—X, and the axes 17 and 19 being arranged inside the perpendicular wheel center longitudinal plane X—X.

The bridge elements 5, 6 are disposed at an acute angle $\beta$ with respect to a perpendicular transverse center plane V—V of the wheel whereby a caster angle is achieved. In this arrangement of the bridge elements 5, 6, the swivel axes 16, 17 on the wheel carrier 4 as well as the axes of shafts 18, 19 on the wheel suspension link 1 are set at an angle $\delta$ with respect to a horizontal plane.

In particular, the swivel axes 16, 17 are arranged at the wheel carrier 4 such that the imaginary plane receiving the bearings extends through the spin axis 11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A wheel suspension system for a motor vehicle for influencing wheel movement during suspension operations comprising:

link bearings coupled to a wheel carrier of the motor vehicle;

a positively guided wheel suspension link which is swivellable on a vehicle body about an axis formed by the link bearings and is supported on the wheel carrier in an articulated manner;

bridge elements, which form coupling squares, said bridge elements linking the wheel suspension link to the wheel carrier in the articulated manner the bridge elements being set with respect to one another at an angle with respect to a perpendicular wheel center longitudinal plane, and such that longitudinal planes which extend through the bridge elements intersect with one another approximately in the perpendicular longitudinal center plane and approximately at a level of a wheel contact surface.

2. A wheel suspension system according to claim 1, wherein each bridge element has two intermediate links extending approximately perpendicularly at both sides of a spin axis of a wheel, and said intermediate links are held in said link bearings so that they can be swivelled about swivel axes, and further comprising shafts extending in the longitudinal direction of the vehicle, said shafts connecting the intermediate links with the wheel suspension link.

3. A wheel suspension system according to claim 2, wherein the bridge elements are arranged on both sides of the perpendicular longitudinal center plane of the wheel.

4. A wheel suspension system according to claim 3, wherein the swivel axes of the bridge elements are arranged on the wheel carrier and in the wheel suspension link in parallel planes with respect to the perpendicular longitudinal center plane.

5. A wheel suspension system according to claim 4, wherein the intermediate links of the two bridge elements are arranged in parallel to one another in the longitudinal planes that extend through the bridge elements.

6. A wheel suspension system according to claim 5, wherein the bridge elements are set at an acute angle with respect to a perpendicular transverse center plane of the wheel, and the swivel axes extend on the wheel carrier and the shafts extend on the wheel suspension link diagonally with respect to a driving direction of the motor vehicle at an angle.

7. A wheel suspension system according to claim 2, wherein the bridge elements are set at an acute angle with respect to a perpendicular transverse center plane of the wheel, and the swivel axes extend on the wheel carrier and the shafts extend on the wheel suspension link diagonally with respect to a driving direction of the motor vehicle at an angle.

8. A wheel suspension system according to claim 2, wherein the swivel axes of the bridge elements are arranged on the wheel carrier and in the wheel suspension link in parallel planes with respect to the perpendicular longitudinal center plane.

9. A wheel suspension system according to claim 1, wherein the intermediate links of the two bridge elements are arranged in parallel to one another in the longitudinal planes that extend through the bridge elements.

10. A wheel suspension system according to claim 1, wherein the bridge elements are arranged on both sides of the perpendicular longitudinal center plane of the wheel.

* * * * *